United States Patent [19]

Nishikawa et al.

[11] 4,093,561

[45] June 6, 1978

[54] CATALYST FOR THE REDUCTION OF NITROGEN OXIDES AND METHOD FOR THE PRODUCTION THEREOF

[75] Inventors: Yasuo Nishikawa; Akira Watanabe; Tetsuya Sugimoto, all of Okayama; Kazuyasu Yabuki, Bizen; Yoshio Hatayama, Kashihara, all of Japan

[73] Assignee: Kyushu Refractories Co., Ltd., Bizen, Japan

[21] Appl. No.: 764,533

[22] Filed: Feb. 1, 1977

[30] Foreign Application Priority Data

Feb. 10, 1976  Japan ................................. 51-13732

[51] Int. Cl.$^2$ ........................ B01J 21/04; B01J 23/74
[52] U.S. Cl. ............................. 252/466 J; 423/213.5

[58] Field of Search ................. 252/466 J; 423/213.5, 423/239, 239 A; 427/215

[56] References Cited

U.S. PATENT DOCUMENTS

| | | | |
|---|---|---|---|
| 3,816,594 | 6/1974 | Kobylinski et al. | 423/213.5 |
| 3,987,146 | 10/1976 | Clay et al. | 423/239 |

*Primary Examiner*—W. J. Shine
*Attorney, Agent, or Firm*—Lane, Aitken, Dunner & Ziems

[57] ABSTRACT

Disclosed is a substance which is obtained by calcining an iron hydroxide or a water-containing iron oxide and coating the surface of the resultant calcined product with alumina. This substance is useful as a catalyst in the removal of nitrogen oxides from an exhaust gas containing the nitrogen oxides.

12 Claims, No Drawings

CATALYST FOR THE REDUCTION OF NITROGEN OXIDES AND METHOD FOR THE PRODUCTION THEREOF

FIELD OF THE INVENTION

This invention relates to a catalyst for the reduction of nitrogen oxides (hereinafter referred to as $NO_x$), which is used for the removal of $NO_x$ from an exhaust gas containing $NO_x$ by the catalytic reduction of $NO_x$ with ammonia, and to a method for the production of a catalyst. This catalyst has durability when an exhaust gas subjected to treatment therewith contains sulfur oxides.

BACKGROUND OF THE INVENTION

Generally, exhaust gases issuing from various conbustion devices contain $NO_x$, occasionally in conjunction with other gaseous components such as sulfur oxides (hereinafter referred to as $SO_x$). The $NO_x$ constitutes the principal cause for the so-called photochemical smog which has posed as a serious social problem. From the standpoint of prevention of air pollution, it is necessary that such an exhaust gas should be released into the atmosphere after it has been freed from $NO_x$.

For the removal of $NO_x$ from an exhaust gas containing $NO_x$, there has been proposed a method which includes contacting the exhaust gas with ammonia in the presence of a catalyst to react the $NO_x$ with ammonia and consequently converting the $NO_x$ into $N_2$. The catalysts which have heretofore been found to be usable in this method include those obtained by impregnating an alumina carrier with oxides of active metals such as iron and copper, for example. The catalyst of this type, however, has the disadvantage that it fails to retain its catalytic activity stably for any appreciable length of time where the exhaust gas subjected to the treatment happens to contain $SO_x$ (for example, $SO_2$ and $SO_3$). Since $Al_2O_3$ forming the carrier of this catalyst reacts with $SO_x$ and causes sulfation of $Al_2O_3$ or adsorption of $SO_x$ onto $Al_2O_3$, the points of activity on the catalyst are occluded eventually to the extent of degrading the catalytic activity. Further, in the case of a catalyst which contains $Fe_2O_3$ as an active component, there is a possibility that $SO_x$ and $Fe_2O_3$ will react to produce ferric sulfate and this reaction product will bring about degradation of the catalytic activity. For the removal of $NO_x$ from an exhaust gas containing the $NO_x$ by the catalytic reduction of the $NO_x$ with ammonia, therefore, the conventional catalysts described above cannot be called satisfactorily usable.

SUMMARY OF THE INVENTION

It is, therefore, an object of this invention to provide a catalyst composed of $Al_2O_3$ and $Fe_2O_3$ and a method for the production of the catalyst, which catalyst when used in the removal of $NO_x$ from an exhaust gas containing the $NO_x$ by the catalytic reduction of the $NO_x$ with ammonia, is not affected by the presence of $SO_x$ in the exhaust gas or by variations in the composition of the exhaust gas, such as with the concentration of $NO_x$.

This and other objects of the present invention will become apparent from the following description of the invention.

It has been discovered that a substance prepared by calcining an iron hydoxide or water-containing iron oxide at a specific temperature and coating the surface of the resultant calcined product with $Al_2O_3$, when used as a catalyst for the reduction of $NO_x$, exhibits a high catalytic activity for a long time even in the presence of $SO_x$.

According to this invention there is provided a catalyst for use in the reduction of $NO_x$, which catalyst includes a calcined product of a specific iron-containing material and a coating of alumina formed on the surface of the calcined product. The present invention further provides a method for the production of the catalyst for the reduction of $NO_x$, which method includes coating the surface of the calcined product with alumina by a specific procedure.

DETAILED DESCRIPTION OF THE INVENTION

The catalyst of the present invention for use in the reduction of $NO_x$ is obtained by calcining at least one inorganic material selected from the group consisting of iron hydoxides and water-containing iron oxides at a temperature not exceeding 550° C, preferably at a temperature falling in the range of from 130° C to 550° C and coating the surface of the resultant calcined product with alumina. This catalyst contains, as its active components, from 60 to 90 percent by weight, preferably from 65 to 80 percent by weight, of $Fe_2O_3$ and from 40 to 10 percent by weight, preferably from 35 to 20 percent by weight, of $Al_2O_3$. As regards the physical properties, this catalyst has an average pore diameter of not more than 500 A, preferably from 100 to 300 A, and a pore volume of not less than 0.1 cc/g, preferably from 0.15 to 0.75 cc/g, as determined by the mercury compression method and a specific surface area of not less than 10 m$^2$/g, preferably from 20 to 300 m$^2$/g, as determined by the so-called BET method.

In the production of the catalyst according to this invention, at least one inorganic material selected from the group consisting of iron hydoxides and water-containing iron oxides is used as the source of iron. The iron compounds described above include those occurring naturally and those manufactured synthetically. The particles of the inorganic material are preferred to have a diameter of not more than 2000 A, preferably a diameter in the range of from 100 to 1000 A. Where the particles happen to be in the shape of needles, they are preferred to have a length of not more than 2000 A, preferably a length in the range of from 1000 to 500 A. In the present invention, the inorganic material is calcined at a temperature of not more than 550° C, preferably at a temperature in the range of from 130 to 550° C. In this case, the calcining is preferred to be carried out so as to remove, from the inorganic material, at least 70 percent by weight of the water of crystallization or the water contained therein in the form of adsorbed water. It should be noted that when the calcining is carried out at a temperature exceeding 550° C, the final product fails to exhibit the desired catalytic activity. As the next step, the surface of the calcined product obtained as described above is coated with an aluminum salt by pulverizing the calcined product to a size of not more than 100 μ, preferably of 5 μ to 50 μ, placing the calcined product thus pulverizing in an aqueous solution containing 5 to 80 percent by weight of the aluminum salt and then agitating the calcined product with the solution to form a mixture, adding a neutralizing agent to the mixture to precipitate the aluminum salt and thereafter ageing the mixture containing the added neutralizing agent. In this case, the pulverized calcined product is placed in 1 to 10 parts by weight of the aqueous solution in an amount of 0.1 to 1 parts by weight thereof. The term "ageing" as used herein means that the mixture is agitated for at least one hour at a temperature of room temperature to 90°, preferably of 60° to 80° C. The aluminum salt used in this case should be soluble in water. Examples of suitable aluminum salts are aluminum nitrate, aluminum sulfate and aluminum formate. As the neutralizing agent, there may suitably be used ammonia, ammonium hydroxide, caustic soda or sodium carbonate. In the present invention, the calcined product which has been coated with an aluminum salt as described above is separated from the liquid and washed and the residue from the separation is dried, then pulverized as required, molded to a suitable shape and baked at a temperature in the range of from 300 to 1200° C, thus producing the catalyst of the present invention. At the time of the baking mentioned above, use of temperatures in the specified range is an essential requirement, because baking at temperatures below the lower limit 300° C or above the upper limit 1200° C cannot product a catalyst which is desirable in terms of strength and activity.

The temperature which is suitable for an exhaust gas containing $NO_x$ to be reduced with ammonia in the presence of the catalyst of this invention produced as described above is in the range of from 250 to 500° C, preferably from 300 to 450° C. The amount of ammonia which is suitable for use in the reduction is of the order of from 0.6 to 1.5, preferably from 0.9 to 1.3, by molar raio based on the total amount of $NO_x$ present in the exhaust gas. It should be noted that the reduction of $NO_x$ is not sufficiently obtained where the amount of ammonia is less than the lower limit of 0.6 by molar ratio and that unaltered ammonia survives in the treated exhaust gas where the amount of ammonia exceeds the upper limit of 1.5. When the exhaust gas is treated with ammonia in the presence of the catalyst of this invention, the denitrification is accomplished at a high rate independent of the coexistence of $SO_x$ in the exhaust gas. Even if the exhaust gas does contain $SO_x$, the catalyst of the present invention enjoys durability in the presence of $SO_x$ as compared with the conventional $Al_2O_3$—$Fe_2O_3$ catalyst and, therefore, is capable of retaining its high activity for a long period of time.

As described above, the present invention has made it possible to provide a catalyst which, when used in the removal of $NO_x$ from an exhaust gas containing the $NO_x$ by virtue of catalytic reduction, provides highly effective removal of $NO_x$ without being affected by the composition of the exhaust gas.

The present invention will be described specifically herein below with reference to preferred embodiments. In the examples and the comparison examples to be cited below, the ratios of $NO_x$ reduction indicated are invariably those computed by the following formula:

$$\left(1 - \frac{\text{Concentration of } NO_x \text{ after contact with packed bed of catalyst}}{\text{Concentration of } NO_x \text{ before contact with packed bed of catalyst}}\right) \times 100\%$$

EXAMPLE 1

In 3 liters of water, 1771, g of $Fe(NO_3)_3.9H_2O$ was dissolved. To the solution, 6N $NH_4OH$ was added to produce $Fe(OH)_3$ in the form of a precipitate. The particle diameter of this $Fe(OH)_3$ was found to be 850 A through determination by use of an electron microscope. This precipitate was separated by filtration, washed with water, dried and then heated at 300° C for 10 minutes enough to effect the removal of at least 75 percent by weight of its water content. Thus, there was obtained a substance resembling an iron oxide. The substance resembling an iron oxide was pulverized to a size less than 50 μ and the resultant powder was placed in and mixed with an aqueous solution obtained by dissolving 1104 g of $Al(NO_3)_3.9H_2O$ in 3 liters of water. The resultant mixture was heated to 80° C and the hot mixture was neutralized to pH 8 by addition thereto of $NH_4OH$ adjusted in advance to 3N so as to produce aluminum nitrate in the form of a precipitate. The mixture which had thus undergone neutralization was left to age for two hours and then subjected to filtration. The solid substance separated by the filtration was washed with water, dehydrated and thereafter dried at 100° C. The dried solid substance was pulverized to a size less than 125 μ, mixed and kneaded with added water, pelletized and dried and finally molded into tablets 3.5 mm in diameter and 3.5 mm in height. A catalyst was made by baking the tablets at 650° C for one hour. Analysis showed this catalyst to be composed of 70 percent by weight of $Fe_2O_3$ and 30 percent by weight of $Al_2O_3$. This catalyst was tested for its activity by packing a stainless steel-made reaction tube 30 mm in diameter with a 25-cc sample of the catalyst and feeding thereto a test gas at a space velocity of 5000 h$^{-1}$. The test gas used for this purpose was composed of 3.5 percent by volume of $O_2$, 15 percent by volume of $CO_2$, 400 ppm of NO, 500 ppm of $NH_3$ (these were based on dry gas), 15 percent volume of $H_2O$ (based on wet gas) and the balance of $N_2$. To test the effect of coexistence of $SO_x$, the test was mixed with 600 ppm of $SO_x$. The results are shown in Table 1. In this particular example, a test was also performed with a test gas having no $SO_x$ content. This was intended to demonstrate that the catalyst of the present invention is effective even in the absence of $SO_x$.

Table 1

| $SO_x$ concentration | Ratio of $NO_x$ reduction (%) | | | | | |
|---|---|---|---|---|---|---|
| | 250° C | 300° C | 350° C | 400° C | 450° C | 500° C |
| 0 | 70 | 97 | 98 | 99 | 99 | 96 |
| 600 ppm | 71 | 98 | 98 | 99 | 99 | 97 |

As is evident from Table 1 above, denitrification of the test gas can be obtained at high rates by use of the catalyst of this invention without reference to the presence or absence of $SO_x$. As regards the physical properties, the catalyst in this example was found to have an average pore diameter of 110 A and a pore volume of 0.25 cc/g as determined by the mercury compression method and a specific surface of 90 m$^2$/g as determined by the so-called BET method.

EXAMPLE 2

For a prolonged period of 4000 hours, an exhaust gas containing $SO_x$ was treated by using the same reaction tube and the same catalyst as used in Example 1 for the purpose of testing the catalyst for ratio of denitrification. The gas was composed of 600 ppm of $SO_x$, 300 ppm of $NO_x$, 15 by volume of $CO_2$, 3.5 percent by volume of $O_2$ and 350 ppm of $NH_3$ (these were based on dry gas) and 15 percent by volume of $H_2O$ (based on wet gas), with the space velocity of feed gas fixed at 10000 H$^{-1}$ and the reaction temperature at 400° C. The results are shown in Table 2. After use, the catalyst was found to have a specific surface area of 86 m²g.

Table 2

| Elapsed time (in hours) | Ratio of NO$_x$ reduction (%) | | | | | | | | |
|---|---|---|---|---|---|---|---|---|---|
|  | 5 | 500 | 1000 | 1500 | 2000 | 2500 | 3000 | 3500 | 4000 |
| Ex. 2 | 97 | 97 | 96 | 95.5 | 95 | 95 | 95.5 | 95 | 94 |

Comparison EXAMPLE 1

In 18 liters of water, 4000 g of Fe(NO$_3$)$_3$.9H$_2$O was dissolved. To the solution, 6N NH$_4$OH was introduced to produce Fe(OH)$_3$ in the form of a precipitate. Through measurement by use of an electron microscope, this Fe(OH)$_3$ was found to have a particular diameter of 850 A. This precipitate was separated by filtration, washed with water, dried, then heated at 300° C for 10 minutes to effect the removal of at least 75 percent by weight of the water content. Consequently, there was obtained a substance resembling an iron oxide. The substance resembling an iron oxide was pulverized to a size of less than 50 µ. Two aliquot parts of the resultant powder were placed one each in two different aqueous solutions of Al(NO$_3$)$_3$.9H$_2$O and mixed. Each resultant mixture was heated to 80° C and the hot mixture was neutralized to pH 8 by incorporation of NH$_4$OH adjusted in advance to 3N so as to produce aluminum nitrate in the form of a precipitate. The mixture which had thus been neutralized was left to age for two hours. The solid substance consequently formed therein was separated by filtration, washed with water, dehydrated and thereafter dried at 100° C. The dried substance was molded into tablets 3.5 mm in diameter and 3.6 mm in height by following the procedure of Example 1. The tablets were baked at 650° C for one hour. One of the catalysts thus produced was composed of 95 percent by weight of Fe$_2$O$_3$ and 5 percent by weight of Al$_2$O$_3$ and the other of 5 percent by weight of Fe$_2$O$_3$ and 50 percent by weight of Al$_2$O$_3$. The two catalysts were tested for activity by the method indicated in Example 2. The results are shown in Table 3, Table 3

| Elapsed time (in hours) | Ratio of NO$_x$ reduction (%) | | | | | | | | |
|---|---|---|---|---|---|---|---|---|---|
|  | 5 | 500 | 1000 | 1500 | 2000 | 2500 | 3000 | 3500 | 4000 |
| Comparison Example 1 (Fe$_2$O$_3$ 95% by weight, Al$_2$O$_3$ 5% by weight) | 97 | 97 | 96 | 95 | 94 | 91 | 89 | 82 | 78 |
| Comparison Example 1 (Fe$_2$O$_3$ 50% by weight, Al$_2$O$_3$ 50% by weight) | 95 | 96 | 96 | 94 | 90 | 85 | 72 | 64 | 53 |

The catalyst of Comparison Example 1 which was composed of 95 percent by weight of Fe$_2$O$_3$ and 5 percent by weight of Al$_2$O$_3$ was found to have an average pore diameter of 350 A, a pore volume of 0.219 cc/g and a specific surface area of 25 m²/g. The catalyst of Comparison Example 1 which was composed of 50 percent by weight of Fe$_2$O$_3$ and 50 percent by weight of Al$_2$O$_3$ was found to have an average pore diameter of 110 A, a pore volume of 0.22 cc/g and a specfic surface area of 80 m²/g. It is clearly shown bo Comparison Example 1 that no stable denitrification is obtained over any appreciable length of time where the composition of the catalyst and the physical properties do not satisfy a fixed set of conditions. After use, the catalyst composed of 95 percent by weight of Fe$_2$O$_3$ and 5 percent by weight of Al$_2$O$_3$ was found to have a decreased specific surface area of 18 m²/g and the other catalyst composed of 50 percent by weight of Fe$_2$O$_3$ and 50 percent by weight of Al$_2$O$_3$ a decreased specific surface area of 4 m²/g.

EXAMPLE 3

In 5 liters of water, 1044 g of FeSO$_4$.7H$_2$O was dissolved. This solution was added, while under agitation, into NaOH adjusted in advance to 5N so as to produce Fe(OH)$_2$ in the form of a precipitate. Through measurement by use of an electron microscope, this Fe(OH)$_2$ was found to have a particle diameter of 230 A. This precipitate Fe(OH)$_2$ was washed with water, separated by repeated filtration, dried at 100°, and thereafter heated at 300° C for 30 minutes to remove more than 90 percent by weight of the water content thereof. Consequently there was produced a substance resembling an iron oxide. The substance resembling an iron oxide was pulverized to a size of less than 50 µ. The powder was placed in and mixed with an aqueous solution obtained by dissolving 1472 g of Al(NO$_3$)$_3$.9H$_2$O in 5 liters of water. To the resultant mixture, NaOH adjusted in advance to 3N was added until the mixture was neutralized to pH 8.3 so as to produce aluminum nitrate in the form of a precipitate. The mixture which had thus undergone the neutralization was left to age for two hours and separated by filtration. The solid substance consequently obtained was washed with water, separated again by filtration, washed with water several times and thereafter dried at 100° C. The dried substance was pulverized to a size of less than 125 µ, mixed with added water, kneaded, pelletized, dried and molded to tablets 3.5 mm in diameter and 3.5 mm in height. A catalyst was formed by baking the tablets at 700° C for one hour. This catalyst was composed of 60 percent by weight of Fe$_2$O$_3$ and 40 percent by weight of Al$_2$O$_3$. This catalyst was tested for its catalytic activity by following the procedure of Example 2. The results obtained by this test are shown in Table 4. The catalyst was shown to have an average pore diameter of 240 A and a pore volume of 0.258 cc/g and was found by the BET method to have a specific surface area of 43 m²/g.

Table 4

| Elapsed time (in hours) | Ratio of NO$_x$ reduction (%) | | | | | | | | |
|---|---|---|---|---|---|---|---|---|---|
|  | 5 | 500 | 1000 | 1500 | 2000 | 2500 | 3000 | 3500 | 4000 |

Table 4-continued

| | Ratio of $NO_x$ reduction (%) | | | | | | | | |
|---|---|---|---|---|---|---|---|---|---|
| Ex. 3 | 96 | 96 | 96 | 95 | 94 | 94.5 | 94 | 94 | 94 |

After use, the catalyst was found to have a specific surface area of 33 m²/g, clearly indicating that pores in the catalyst particles had been clogged.

Comparison EXAMPLE 2

At 900° C, 2151 g of $Fe(NO_3)_3.9H_2O$ was heated for three hours to be converted into $Fe_2O_3$. Through measurement by use of an electron microscope, this $Fe_2O_3$ was found to have a particle diameter of 2300 A. This $Fe_2O_3$ was pulverized to a size of not more than 100 μ and the powder was mixed with a solution obtained by dissolving 552 g of $Al(NO_3)_3.9H_2O$ in 3 liters of water. The mixture was heated to 80° C and to the hot mixture was added $NH_4OH$ adjusted in advance to 3N until the mixture was neutralized to pH 8 so as to produce aluminum nitrate in the form of a precipitate. The mixture thus neutralized was left to age for three hours and separated by filtration. The solid substance consequently obtained was washed with water, dehydrated, and thereafter dried at 100° C. The dried substance was pulverized to a size of less than 125 μ. The powder was mixed with added water, kneaded, pelletized, dried and molded into tablets 3.5 mm in diameter and 3.5 mm in height. The tablets were baked at 650° C for one hour to produce a catalyst. This catalyst was found to be composed of 85 percent by weight of $Fe_2O_3$ and 15 percent by weight of $Al_2O_3$. The catalyst was shown to have an average pore diameter of 600 A and a pore volume of 0.09 cc/g and was found by the BET method to have a specific surface area of 6 m²/g. This catalyst was tested for its catalytic activity over a prolonged period of 2500 hours under the conditions indicated in Example 2. The results of the test are shown in Table 5.

Table 5

| | Ratio of $NO_x$ reduction (%) | | | | | | | | |
|---|---|---|---|---|---|---|---|---|---|
| Elapsed time (in hours) | 5 | 500 | 1000 | 1500 | 2000 | 2500 | 3000 | 3500 | 4000 |
| Ex. 2 | 90 | 84 | 80 | 76 | 72 | 65 | — | — | — |

In this comparison example, the catalyst containing its constituents at percentages falling in the respective ranges specified by this invention was prepared from $Fe_2O_3$ particles of a large diameter and this catalyst was treated for its activity as mentioned above. Table 5 shows that the initial activity was low and that the ratio of denitrification fell to a considerable extent around the 2500th hour, at which time therefore the activity test was discontinued. The results indicate that when a catalyst is obtained by using, as the iron source, $Fe_2O_3$ particles of a large diameter instead of using an iron hydroxide, it fails to exhibit desired physical properties or to provide stable denitrification. After use, the catalyst was found to have a specific surface area of 211 m²/g.

EXAMPLE 4

An aqueous 1.1 percent $H_2O_2$ solution measuring 20 liters was heated at 60° C. This hot aqueous solution was gradually added to a solution obtained by dissolving 2 kg of $Fe_2(SO_4)_3.12H_2O$ in 15 liters of water so as to cause precipitation. The solution thus containing the precipitate was agitated for three hours, then cleansed with a heated weak ammonia water and further washed several times with water. Thereafter, the solution having the precipitate suspended therein was bubbled with steam for several hours and then filtered. The precipitate thus separated was dried at 60° C. Consequently there was obtained 473 g of a powder which was found to be FeO(OH). The particles of this FeO(OH) had a diameter of 150 A. This FeO(OH) was heated at 275° C for 30 minutes and thereby converted into a substance resembling an iron oxide. Then, this substance was pulverized to a size of not more than 50 μ and the powder was suspended in 5 liters of water. To this suspension was added 552 g of $Al(NO_3)_3.9H_2O$. The resultant mixture was heated to 60° C and then neutralized to pH 8.3 by addition of 1N ammonia water. The neutralized mixture was subjected to several cycles of filtration and washing with water. The solid substance consequently obtained was dried at 100° C and pulverized to a size of not more than 125 μ. This powder was kneaded with added water, pelletized, dried and thereafter molded into tablets 3.5 mm in diameter and 3.5 mm in height. The tablets were baked at 800° C for two hours to produce a catalyst. This catalyst was found to be composed of 85 percent by weight of $Fe_2O_3$ and 15 percent by weight of $Al_2O_3$. It was shown to have an average pore diameter of 130 A and a pore volume of 0.585 cc/g and was found by the BET method to have a specific surface area of 180 m²/g. This catalyst was tested for its catalytic activity by following the procedure of Example 2. The results of the test are shown in Table 6.

Table 6

| | Ratio of $NO_x$ reduction (%) | | | | | | | | |
|---|---|---|---|---|---|---|---|---|---|
| Elapsed time (in hours) | 5 | 500 | 1000 | 1500 | 2000 | 2500 | 3000 | 3500 | 4000 |
| Ex. 4 | 98 | 97 | 97.5 | 97 | 97 | 96 | 96 | 95 | 95 |

After use, the catalyst was found to have a specific surface area of 170 m²/g, indicating that the pores in the catalyst particles had hardly been clogged in the course of the treatment.

Conparison EXAMPLE 3

In 3 liters of water, 1771 g of $Fe(NO_3)_3.9H_2O$ was dissolved. To the solution was introduced 6N $NH_4OH$ to produce $Fe(OH)_3$ in th form of precipitate. Through measurement by use of an electron microscope, this precipitate $Fe(OH)_3$ was found to have a particle diameter of 850 A. Separately, 1104 g of $Al(NO_3)_3.9H_2O$ was dissolved in 3 liters of water and the resultant solution was agitated with the formerly precipitated $Fe(OH)_3$. The mixture was heated to 80° C. To the hot mixture was added $NH_4OH$ adjusted in advance to 3N until the resultant aqueous solution was neutralized to pH 8.2 so as to produce aluminum nitrate in the form of a precipitate. Further, the mixture which had thus been neutralized was left to age for two hours, then filtered. The solid substance consequently obtained was washed with water, filtered and thereafter dried at 100° C. The dried substance was pulverized to a size of not more than 125 μ. The powder was mixed with added water, kneaded, pelletized, dried and then molded into tablets 3.5 mm in diameter and 3.5 mm in height. The tablets were baked at 650° C for one hour to produce a catalyst. This catalyst was found to be composed of 70 percent by weight of $Fe_2O_3$ and 30 percent by weight of $Al_2O_3$. Although this catalyst resembled that of Example 1, it used as the iron source an iron hydroxide, which was not given any preliminary calcining treatment but was in its unaltered form, namely in a form not yet converted into a substance resembling an iron oxide, and it was formed by coating the surface of the iron source with an alumina source such as to be converted into $Al_2O_3$. The catalyst was found to have an average pore diameter of 90 A and a pore volume of 0.522 cc/g and was shown by the BET method to have a specific surface area of 232 $m^2/g$. It was tested for its catalytic activity by following the procedure of Example 2. The results are shown in Table 7.

Table 7

| Elapsed time (in hours) | Ratio of $NO_x$ reduction (%) | | | | | | | |
|---|---|---|---|---|---|---|---|---|
| | 5 | 500 | 1000 | 1500 | 2000 | 2500 | 3000 | 3500 | 4000 |
| Comparison Ex. 3 | 98 | 97 | 93 | 90 | 85 | 70 | 53 | — | — |

The catalyst showed an excellent initial activity. With elapse of time however, the activity was degraded so heavily that the test was discontinued after elapse of 3000 hours. After use, the catalyst was found to have a specific surface area of only 3.5 $m^2/g$, indicating that pores in the catalyst particles were heavily clogged.

EXAMPLE 5

A solution obtained by dissolving 152 g of $FeSO_4.7H_2O$ in 1 liter of water and another solution obtained by dissolving 1333 g of $Fe_2(SO_4)_3.xH_2O$ in 1 liter of water were mixed. The resultant mixture was heated to 90° C and this hot mixture was added to an aqueous solution of NaOH heated to 90° C and adjusted tp 6N so as to produce a precipitate. At the time that the precipitate was formed, the resulting mixture had a pH value of 12.5. The precipitate was washed with hot water, filtered and thereafter dried thoroughly at 90° C. The dry precipitate thus obtained was a hydrated magnetite ($Fe_3O_4.xH_2O$). Through measurement by use of an electron microscope it was found to have a particle diameter of 350 A. It was further heated at 400° C for 10 minutes so as to be converted into a substance resembling an iron oxide. This substance resembling an iron oxide weighing 240 g was pulverized to a size of not more than 50 $\mu$ and the resultant powder was suspended in an aqueous solution obtained by dissolving 589 g of $Al(NO_3)_3.9H_2O$ in 3 liters of water. Thereafter, $NH_4OH$ adjusted in advance to 3N was added to the suspension until the resulting mixture showed a pH value of 8.2 so as to produce a precipitate. This precipitate was separated out by filtration, washed with water several times and then dried at 100° C. The dried substance was pulverized to a size of not more that 0.125 $\mu$, mixed with added water, kneaded, pelletized, dried and finally molded into tablets 3.5 mm in diameter and 3.5 mm in height. The tablets were baked at 700° C for one hour to produce a catalyst. The catalyst was found to have an average pore diameter of 150 A and a pore volume of 0.48 cc/g and was shown by the BET method to have a specific surface area of 130 $m^2/g$. It was found to he composed of 75 percent by weight of $Fe_2O_3$ and 25 percent by weight of $Al_2O_3$. This catalyst was tested for its catalytic activity by following the procedure of Example 2. The results are shown in table 8.

Table 8

| Elapsed time (in hours) | Ratio of $NO_x$ reduction (%) | | | | | | | |
|---|---|---|---|---|---|---|---|---|
| | 5 | 500 | 1000 | 1500 | 2000 | 2500 | 3000 | 3500 | 4000 |
| Ex. 5 | 97.5 | 97 | 97 | 96 | 96 | 96 | 95.5 | 95.5 | 95 |

After use, the catalyst was found to have a specific surface area of 120 $m^2/g$.

Comparison EXAMPLE 4

Granular $\gamma$-$Al_2O_3$ (3 to 4 mm in particle diameter) available in the market was impregnated with 10 percent by weight of $FeSO_4$ through the medium of water as a solvent. The impregnated alumina was subject to calcining treatment at 450° C for two hours. The catalyst thus formed was found to have an average pore diameter of 97 A and a pore volume of 0.34 cc/g. and was shown by the BET method to have a specific surface area of 140 $m^2/g$. This catalyst was tested for its catalytic activity by following the procedure of Example 2. The results of the test are shown in Table 9.

Table 9

| Elapsed time (in hours) | Ratio of $NO_x$ reduction (%) | | | | | | | |
|---|---|---|---|---|---|---|---|---|
| | 5 | 500 | 1000 | 1500 | 2000 | 2500 | 3000 | 3500 | 4000 |
| Comparison Ex. 4 | 98 | 71 | — | — | — | — | — | — | — |

In the case of this catalyst, considerably degradation of activity was recognized already after 500 hours of the activity test. Thus, the test was discontinued at this point. After use, this catalyst was found by the BET method to have a specific surface area of 9 $m^2/g$. These results clearly indicate that this catalyst has a short durability as compared with the catalyst of the present invention and that the catalyst of this invention is advantageous over the conventional catalyst.

What is claimed is:

1. A catalyst for the reduction of nitrogen oxides obtained by calcining at least one particulate iron hydroxide at a temperature not exceeding 550° C and coating the calcined particles with an aqueous solution of an aluminum salt, washing, drying and molding the particles having the aluminum salt coating, followed by baking to form an alumina coating, said catalyst containing 60 to 90 percent by weight of $Fe_2O_3$ and 40 to 10 percent by weight of $Al_2O_3$ and having an average pore diameter of not more than 500 A, a pore volume of not less than 0.1 cc/g and a specific surface area of not less than 10 $m^2/g$.

2. The catalyst of claim 1, wherein said average pore diameter falls in the range of from 100 to 300 A.

3. The catalyst of claim 1, wherein said pore volume falls in the range of from 0.15 to 0.75 cc/g.

4. The catalyst of claim 1, wherein said specific surface area falls in the range of from 20 to 300 $m^2/g$.

5. The catalyst of claim 1, wherein the calculating of said iron hydroxide is carried out at a temperature in the range of from 130 to 550° C.

6. The catalyst of claim 1 wherein said particulate material has a particle diameter in the range of from 100 to 1000 A.

7. A method for the production of a catalyst for the reduction of nitrogen oxides, which method comprises:
   (a) calcining at least one iron hydroxide at a temperature not exceeding 550° C;
   (b) pulverizing the resultant calcined material to a size of not more than 100μ;
   (c) introducing 0.1 to 1 parts by weight of the thus pulverized material, while agitating into 1 to 10 parts by weight of an aqueous solution containing 5 to 80% by weight of an aluminum salt and subsequently neutralizing the solution thereby causing precipitation of the aluminum salt present in said mixture;
   (d) ageing the neutralized mixture, thereby coating the surface of said calcined material with said aluminum salt;
   (e) separating the coated calcined material obtained in step (d), washing and drying the coated material and molding the coated material to suitable shape; and
   (f) subsequently baking the calcined material thus coated with the aluminum salt at a temperature in the range of from 300° to 1200° C.

8. The method of claim 7, wherein said iron hydroxide has a particle diameter in the range of from 100 to 1000 A.

9. The method of claim 7, wherein the calcining of said iron hydroxide is carried out at a temperature falling in the range of from 130° to 550° C.

10. The method of claim 7, wherein said aluminum salt is one member selected from the group consisting of aluminum nitrate, aluminum sulfate and aluminum formate.

11. The method of claim 7, wherein said neutralizing is performed with an agent selected from the group consisting of ammonia, ammonium hydroxide, caustic soda and sodium carbonate.

12. The product produced by the process of claim 7.

* * * * *

UNITED STATES PATENT AND TRADEMARK OFFICE
CERTIFICATE OF CORRECTION

PATENT NO. : 4,093,561
DATED : June 6, 1978
INVENTOR(S) : NISHIKAWA ET AL

It is certified that error appears in the above-identified patent and that said Letters Patent are hereby corrected as shown below:

Column 1, line 11, change "a" (second occurrence) to --the--.

Column 3, line 63, delete the comma (,) after "1771".

Column 4, line 30, change "$CO_{22}$" to --$CO_2$--;

line 32, after "percent" insert --by--;

line 34, after "test" insert --gas--;

line 64, after "15" insert --%--.

Column 5, line 17, change "particular" to --particle--;

line 36, change "3.6" to --3.5--;

line 40, change "5" to --50--;

line 66, change "bo" to --by--.

Column 6, line 18, after "100°" insert --C--.

Column 7, line 4, change "94" (last in column) to --93--.

Column 8, line 48, change "th" to --the--.

UNITED STATES PATENT AND TRADEMARK OFFICE
CERTIFICATE OF CORRECTION

PATENT NO. : 4,093,561
DATED : June 6, 1978
INVENTOR(S) : NISHIKAWA ET AL

It is certified that error appears in the above-identified patent and that said Letters Patent are hereby corrected as shown below:

Column 9, line 37, change "tp" to --to--;

line 57, change "that" to --than--;

line 64, change "he" to --be--.

Column 10, line 20, delete the period (.) after "g".

Signed and Sealed this

Sixth Day of March 1979

[SEAL]

Attest:

RUTH C. MASON
*Attesting Officer*

DONALD W. BANNER
*Commissioner of Patents and Trademarks*